(No Model.)

M. HIRST.
HITCHING DEVICE.

No. 398,780. Patented Feb. 26, 1889.

WITNESSES:
P. F. Sagle
Wm. H. Carson.

INVENTOR
Matthew Hirst
per George E. Buckley
his Atty.

UNITED STATES PATENT OFFICE.

MATTHEW HIRST, OF PHILADELPHIA, PENNSYLVANIA, ASSIGNOR TO LOUIS DE GEER, OF NEW YORK, N. Y.

HITCHING DEVICE.

SPECIFICATION forming part of Letters Patent No. 398,780, dated February 26, 1889.

Application filed February 7, 1887. Serial No. 226,793. (No model.)

*To all whom it may concern:*

Be it known that I, MATTHEW HIRST, a citizen of the United States, and a resident of Philadelphia, Pennsylvania, have invented a certain new and Improved Self-Detachable Hitch for Holding Horses, of which the following is a full, clear, and exact description, reference being had to the annexed drawings, making part hereof.

The object of my invention is to provide a hitch adapted to receive the halter or strap by which a horse, cow, or other animal is held tethered, which hitch will hold firmly against a direct outward pull, but which will release itself when a downward and outward pull is made upon it, whereby, if the animal crosses the halter under its chest or belly or leg, the downward pull thus occasioned will free the halter and save the animal from being thrown.

The nature of the invention will fully appear from the following specification and claims.

Figure 1:
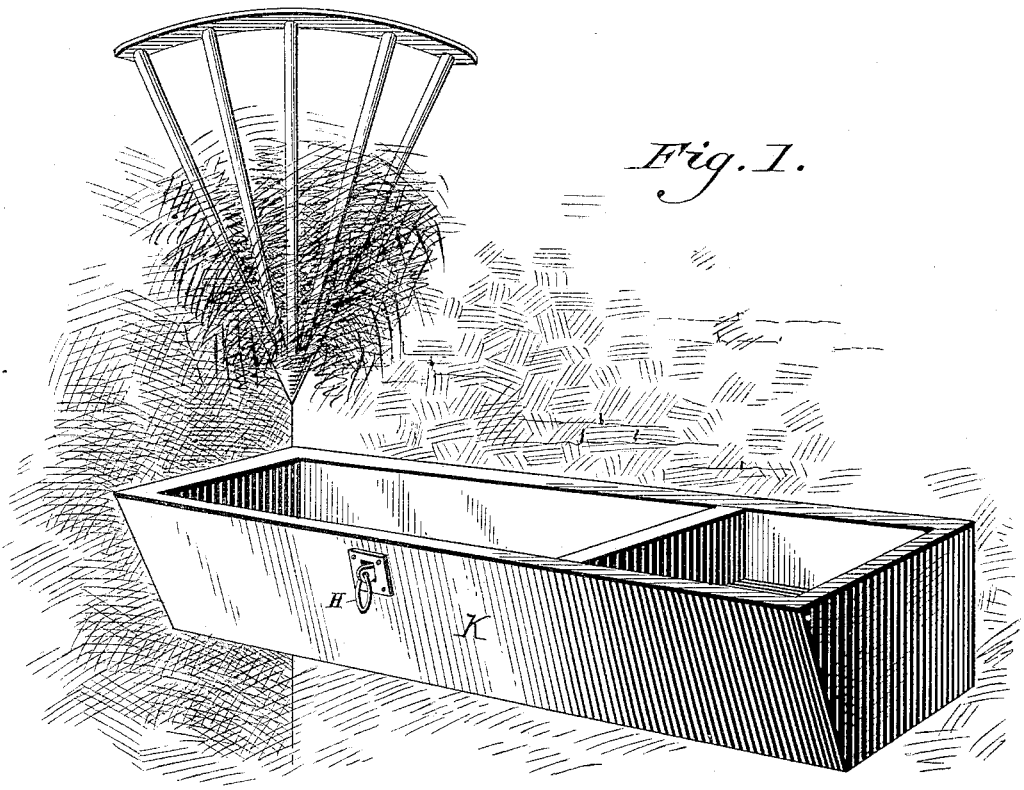
Figure 2:
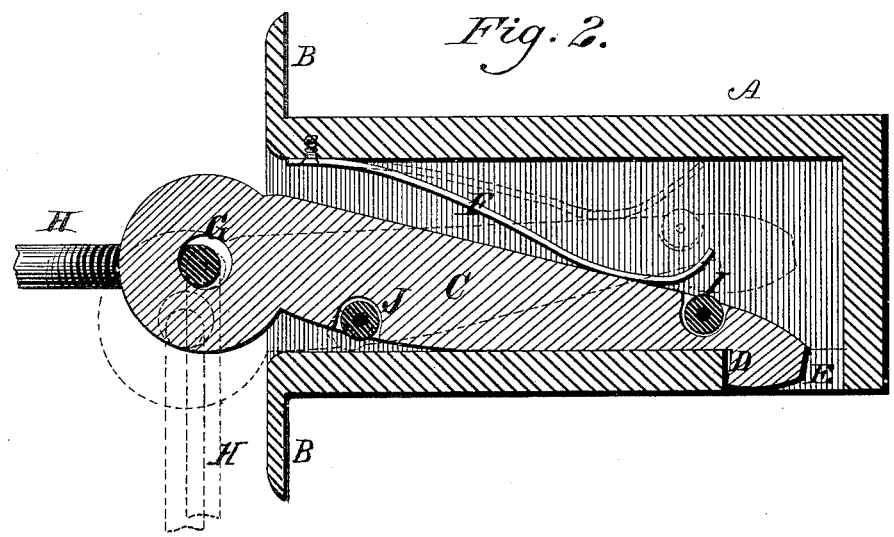

Figure 1 is a perspective view of a feed-trough with my device attached, also showing a rack containing a modicum of hay for the sustenance of the animal which is to be hitched; Fig. 2, an enlarged longitudinal vertical sectional view of my device, showing the arrangement of the operating parts thereof.

A is the box or shell of the hitch, provided with a flange, B. The latter may be pierced with holes to receive screws or nails, by which the device can be secured to a feed-trough, wall, or partition, in the manner shown in Fig. 1.

C is a bolt provided with a catch, D, which latter engages over the edge of a recess or opening, E, in the rear bottom part of box A.

F is a bent band-spring, secured at one end to the inside of the top of box A, and bearing below against the upper part of the inner end of bolt C, to hold said inner end down and maintain the catch D in engagement with the edge of opening E. The outer end of bolt C is pierced with a hole, at G, to receive a ring, H, to which latter the halter-strap is tied or secured.

I and J are anti-friction wheels to facilitate the movement of the bolt C out of the box A when a downward pressure is exerted on the outer or ringed end of the bolt.

The dotted lines in Fig. 2 show the bolt in the act of being drawn out of the box A, though the dotted lines H should indicate the ring as inclining a little outward as well as downward, as the body of the animal tangled with the halter-strap will be at a little distance away from the trough or wall to which it is hitched, and the pull on the bolt will be outward as well as downward.

The operation is as follows: The animal is generally hitched on a line with its chest, with a strap long enough to permit a free movement of its head without jerking on the ring to which the halter-strap is secured; but if such animal crosses the halter-strap a downward and outward pull on the ring H will result, and the bolt C will first tilt, as shown in dotted lines in Fig. 2, and then be pulled out of the box A, the friction-wheels I and J facilitating the passage of the bolt out of the box.

K is the front of a feed-trough to which my device is affixed.

The manner herein indicated of securing the box is by piercing the front of the trough, inserting the box therein, and screwing or nailing the flange B against the front of the trough. It may be so secured in a wall or partition.

The spring F may be called a "depressor," and it is so designated in my claims, because its office is to impinge against and depress one end of the tilting bolt and thus to raise the other end thereof. To depress one end of the tilting bolt is an essential feature of my device.

What I claim as new is—

1. The combination of shell A, provided with a shoulder to stay the bolt C, tilting bolt C, a catch, D, to engage with said shoulder, and depressor F, bearing upon said bolt to depress the inner end and elevate the outer end thereof, substantially as described.

2. The combination of shell A, having a recess, E, provided with a shoulder to stay the bolt C, tilting bolt C, provided with a friction-wheel and having a catch adapted to engage with said shoulder, and depressor F, bearing upon bolt C to depress the inner end and elevate the outer end thereof, substantially as described.

MATTHEW HIRST.

Witnesses:
WM. H. CARSON,
N. H. CULVER.